United States Patent
Bockrath et al.

(10) Patent No.: US 10,298,384 B2
(45) Date of Patent: May 21, 2019

(54) HARDENED VOIP SYSTEM

(71) Applicant: Clever Devices Ltd., Woodbury, NY (US)

(72) Inventors: Philip B Bockrath, Issaquah, WA (US); Darryl G Curtis, Mount Vernon, WA (US)

(73) Assignee: Clever Devices Ltd., Woodbury, NY (US)

( * ) Notice: Subject to any disclaimer, the term of this patent is extended or adjusted under 35 U.S.C. 154(b) by 0 days.

(21) Appl. No.: 16/055,432

(22) Filed: Aug. 6, 2018

(65) Prior Publication Data

US 2018/0343108 A1    Nov. 29, 2018

Related U.S. Application Data

(63) Continuation of application No. 15/584,688, filed on May 2, 2017, now Pat. No. 10,044,498.

(Continued)

(51) Int. Cl.

| | |
|---|---|
| *H04L 9/00* | (2006.01) |
| *H04W 4/10* | (2009.01) |
| *H04W 76/16* | (2018.01) |
| *H04L 12/707* | (2013.01) |
| *H04L 29/12* | (2006.01) |
| *H04L 29/06* | (2006.01) |
| *H04L 29/14* | (2006.01) |
| *H04L 12/58* | (2006.01) |

(52) U.S. Cl.
CPC .......... *H04L 9/002* (2013.01); *H04L 61/1529* (2013.01); *H04L 65/00* (2013.01); *H04L 65/1073* (2013.01); *H04L 67/42* (2013.01); *H04L 69/08* (2013.01); *H04L 69/40* (2013.01); *H04W 76/16* (2018.02); *H04L 45/22* (2013.01); *H04L 51/00* (2013.01); *H04W 4/10* (2013.01)

(58) Field of Classification Search
CPC ... H04L 9/002; H04L 61/1529; H04L 67/327; H04L 69/18; H04L 29/06; H04L 45/22; H04W 4/10
USPC ........................................................ 455/410
See application file for complete search history.

(56) References Cited

U.S. PATENT DOCUMENTS

| | | | |
|---|---|---|---|
| 6,968,180 B2 | 11/2005 | Kirby | 455/414.1 |
| 7,328,042 B2 | 2/2008 | Choksi | 455/552.1 |

(Continued)

*Primary Examiner* — William Nealon
(74) *Attorney, Agent, or Firm* — Niro McAndrews, LLP

(57) ABSTRACT

A hardened VoIP system is presented that includes secure push-to-talk voice functionality. Through the addition of encryption, authentication, user filtering, and integration with the new and existing LMR systems, a secure voice platform ensures malicious software, unauthorized access and brute force security attacks will not compromise the voice communications of the system. The VoIP system is engineered to ensure graceful system degradation in the event of maintenance activities, natural disasters and failure modes. The hardened VoIP system offers the functions a LMR trunking system while utilizing broadband connections. Private calls, group calls, Emergency Alarms with covert monitoring capability, scanning and priority scanning may be incorporated into the system. The system includes a VoIP controller that serves as a trunking controller, manages available VoIP based conference bridges, and assigns them as needed to the parties involved in each voice call.

19 Claims, 6 Drawing Sheets

Related U.S. Application Data

(60) Provisional application No. 62/435,562, filed on Dec. 16, 2016.

(56) References Cited

U.S. PATENT DOCUMENTS

| | | | | |
|---|---|---|---|---|
| 7,633,914 | B2 | 12/2009 | Shaffer | 370/338 |
| 7,636,339 | B2 | 12/2009 | Shaffer | 370/338 |
| 7,639,634 | B2 | 12/2009 | Shaffer | 370/266 |
| 7,706,339 | B2 | 4/2010 | Shaffe | 370/338 |
| 7,724,743 | B2 | 5/2010 | Razdan | 370/392 |
| 7,751,348 | B2 | 7/2010 | Shaffer | 370/260 |
| 7,764,973 | B2 | 7/2010 | Shaffer | 455/520 |
| 7,792,899 | B2 | 9/2010 | Shaffer | 709/204 |
| 7,809,390 | B2 | 10/2010 | Shaffer | 455/518 |
| 7,831,270 | B2* | 11/2010 | Kalley | H04L 12/1822 455/518 |
| 7,839,811 | B2 | 11/2010 | Martinez | 370/312 |
| 7,860,070 | B2 | 12/2010 | Shaffer | 370/338 |
| 7,869,386 | B2 | 1/2011 | Shaffer | 370/260 |
| 7,970,425 | B2 | 6/2011 | Balachandran | 455/519 |
| 8,045,998 | B2 | 10/2011 | Shaffer | 455/456.2 |
| 8,085,671 | B2 | 12/2011 | Shaffer | 370/237 |
| 8,145,249 | B2 | 3/2012 | Shaffer | 455/518 |
| 8,145,262 | B2 | 3/2012 | Martinez | 455/552.1 |
| 8,169,983 | B2 | 5/2012 | Janky | 370/338 |
| 8,189,460 | B2 | 5/2012 | Shaffer | 370/229 |
| 8,194,682 | B2 | 6/2012 | Martinez | 370/401 |
| 8,233,422 | B2 | 7/2012 | Martinez | 370/312 |
| 8,260,338 | B2 | 9/2012 | Shaffer | 455/518 |
| 8,279,868 | B2 | 10/2012 | Martinez | 370/392 |
| 8,280,422 | B2* | 10/2012 | Forsten | H04W 4/10 455/518 |
| 8,359,066 | B2 | 1/2013 | Martinez | 455/552.1 |
| 8,385,964 | B2 | 2/2013 | Haney | 455/519 |
| 8,396,002 | B2 | 3/2013 | Marshall-Wilson | 370/252 |
| 8,406,168 | B2 | 3/2013 | Richeson | 370/328 |
| 8,472,418 | B2 | 6/2013 | Shaffer | 370/338 |
| 8,537,743 | B2 | 9/2013 | Barave | 370/328 |
| 8,547,856 | B2 | 10/2013 | Spring | 370/252 |
| 8,570,909 | B1 | 10/2013 | Shaffer | 370/260 |
| 8,634,799 | B1 | 1/2014 | Economy | 455/404.1 |
| 8,661,253 | B2 | 2/2014 | Wen | 713/168 |
| 8,676,243 | B2 | 3/2014 | Blanco | 455/518 |
| 8,676,244 | B2 | 3/2014 | Blanco | 455/518 |
| 8,712,441 | B2 | 4/2014 | Haney | 455/456.3 |
| 8,750,898 | B2 | 6/2014 | Haney | 455/456.1 |
| 8,798,593 | B2 | 8/2014 | Haney | 455/414.1 |
| 8,798,645 | B2 | 8/2014 | Haney | 455/456.2 |
| 8,798,647 | B1 | 8/2014 | Haney | 455/456.3 |
| 8,831,635 | B2 | 9/2014 | Haney | 455/456.2 |
| 8,874,159 | B2 | 10/2014 | Shaffer | 455/519 |
| 8,976,730 | B2 | 3/2015 | Chu | 370/328 |
| 8,989,740 | B2 | 3/2015 | Economy | 455/436 |
| 9,031,581 | B1 | 5/2015 | Haney | 455/456.3 |
| 9,042,929 | B2 | 5/2015 | Kuehner | 455/518 |
| 9,065,679 | B2 | 6/2015 | Martinez | |
| 9,112,746 | B2 | 8/2015 | Shaffer | |
| 9,161,272 | B2 | 10/2015 | Ofir | |
| 9,167,381 | B2 | 10/2015 | Mcdonald | |
| 9,167,558 | B2 | 10/2015 | Haney | |
| 9,173,134 | B2 | 10/2015 | Chen | |
| 9,185,522 | B1 | 11/2015 | Haney | |
| 9,253,616 | B1 | 2/2016 | Haney | |
| 9,277,428 | B2 | 3/2016 | Chowdhary | |
| 9,307,370 | B1* | 4/2016 | Pai | H04W 4/10 |
| 9,319,850 | B2 | 4/2016 | Lin | |
| 9,467,832 | B2 | 10/2016 | Haney | |
| 9,480,096 | B1 | 10/2016 | Lee | |
| 2002/0151321 | A1 | 10/2002 | Winchell | 455/519 |
| 2002/0196781 | A1 | 12/2002 | Salovuori | 370/352 |
| 2004/0121781 | A1 | 6/2004 | Sammarco | 455/456.1 |
| 2006/0084457 | A1 | 4/2006 | Laha | 455/519 |
| 2006/0291400 | A1* | 12/2006 | Balasaygun | H04L 29/06 370/242 |
| 2007/0105578 | A1 | 5/2007 | Shaffer | 455/518 |
| 2007/0280203 | A1 | 12/2007 | Shaffer | 370/352 |
| 2008/0031275 | A1* | 2/2008 | Janky | H04W 88/181 370/466 |
| 2008/0171533 | A1* | 7/2008 | Sharp | H04W 88/16 455/410 |
| 2008/0200162 | A1* | 8/2008 | Chowdhury | H04L 12/1836 455/422.1 |
| 2008/0205321 | A1* | 8/2008 | Martinez | H04L 12/189 370/312 |
| 2009/0054029 | A1 | 2/2009 | Hogberg | 455/404.2 |
| 2014/0348066 | A1* | 11/2014 | Patel | H04W 4/10 370/328 |
| 2015/0057040 | A1* | 2/2015 | Kuehner | H04W 4/08 455/509 |
| 2015/0079919 | A1 | 3/2015 | Shahaf | 455/404.1 |
| 2015/0079920 | A1 | 3/2015 | Mcdonald | 455/404.1 |
| 2015/0172875 | A1 | 6/2015 | Lin | 455/518 |
| 2016/0036624 | A1* | 2/2016 | Roy | H04L 41/0668 370/221 |
| 2016/0066177 | A1* | 3/2016 | Natarahjan | H04W 8/186 370/312 |
| 2016/0095067 | A1 | 3/2016 | Jurzak | 370/311 |
| 2016/0105291 | A1* | 4/2016 | Anchan | H04L 12/189 370/312 |
| 2016/0105773 | A1 | 4/2016 | Wawrowski | 455/456.2 |
| 2016/0135230 | A1* | 5/2016 | Swierczynski | H04W 4/10 455/518 |
| 2016/0219418 | A1* | 7/2016 | Sakazume | H04W 4/10 |
| 2016/0226937 | A1* | 8/2016 | Patel | H04L 65/4061 |
| 2016/0227384 | A1 | 8/2016 | Mazzarella | 455/519 |
| 2016/0269876 | A1 | 9/2016 | Senese | 455/518 |
| 2017/0006448 | A1 | 1/2017 | Igumnov | |
| 2017/0006449 | A1 | 1/2017 | Igumnov | |
| 2017/0231014 | A1* | 8/2017 | Patel | H04W 4/10 |
| 2018/0054350 | A1* | 2/2018 | Roy | H04L 41/0668 |

\* cited by examiner

Fig. 5

| | Device Number | MAC Address | IMEI | Talk Group | Status | LMR-Talk (Mhz) | LMR-Receive (MHz) |
|---|---|---|---|---|---|---|---|
| 501 | 355503 | F3-C0-FA-19-E7-9F | 4556879199930804 | 24601 | LTE | 860.0375 | 815.0375 |
| 502 | 524502 | 8F-19-85-D9-3B-0B | 5314103747740313 | 24601 | LTE | 860.0375 | 815.0375 |
| 503 | 973456 | E8-7C-FF-54-22-56 | 5314103747740313 | 24601 | LMR | 860.0375 | 815.0375 |
| 504 | 221567 | 1D-5B-06-3B-D6-CD | 1066715337720323 | 24601 | LMR | 860.0375 | 815.0375 |
| 505 | 355618 | EA-F3-74-C0-01-10 | 5079232866678025 | 24601 | LTE | 860.0375 | 815.0375 |
| 506 | 876211 | 29-DC-F1-F5-2C-1B | 4996819941540149 | 86753 | LTE | 857.3375 | 860.3375 |
| 507 | 569517 | 8E-AD-5A-86-6D-72 | 3055407846651249 | 86753 | WiFi | 857.3375 | 860.3375 |
| 508 | 924646 | 0D-96-CF-C8-73-5C | 5023953195996927 | 86753 | LTE | 857.3375 | 860.3375 |
| 509 | 159605 | 18-08-9E-A6-35-F2 | 4583189127715524 | 86753 | LTE | 857.3375 | 860.3375 |

470 — Device Number
475 — MAC Address
480 — IMEI
485 — Talk Group
490 — Status
495 — LMR-Talk (Mhz)
500 — LMR-Receive (MHz)

HARDENED VOIP SYSTEM

CROSS REFERENCE TO CO-PENDING APPLICATION

This application is a continuation of application Ser. No. 15/584,688 that was filed on May 2, 2017 and issued as U.S. Pat. No. 10,044,498 on Aug. 6, 2018 and claimed priority to U.S. Provisional Patent Application No. 62/435,562 filed Dec. 16, 2016 and entitled "Hardened VoIP System," the contents of which are herein fully incorporated by reference.

FIELD OF THE INVENTION

The present invention relates generally to fault tolerant mobile communication systems, and specifically relates to hardened voice over IP (VoIP) systems with push to talk (PIT) functionality that integrate into existing land mobile radio (LMR) systems.

BACKGROUND OF THE INVENTION

LMR systems are wireless communications systems generally intended for use by terrestrial users in vehicles or on foot. Such systems are often used by emergency first responder organizations such as police, fire and ambulance services, public works organizations, dispatched services such as taxis, and companies with large vehicle fleets or numerous field staff. LMR systems are often independent, but can be connected to other fixed systems such as the public switched telephone network (PSTN) or cellular networks.

Radio over Internet Protocol (ROW) is similar to VoIP, but augments two-way radio communications rather than telephone calls. With RoIP, at least one node of a network is a radio (or a radio with an IP interface device) connected via IP to other nodes in the radio network. The other nodes can be two-way radios, but can also be dispatch consoles, either traditional (hardware) or mode (software on a PC), plain old telephone service (POTS) telephones, softphone applications running on a computer s a smartphone or some other communications device accessible over IP, RoIP has been deployed over private networks as well as the Internet. RoIP has shown to be useful in land mobile radio systems used by public safety departments and utility fleets spread over a broad geographic area. Like other centralized radio systems such as trunked radio systems, issues of delay or latency and reliance on centralized infrastructure can be impediments to adoption by public safety agencies.

Examples of previous attempts to integrate LMR with VoIP include U.S. Pat. No. 8,145,262 issued to Martinez that claims to disclose a multimode LMR and a method of communicating LMR content using an LMR device. The Martinez LMR system includes an LMR communication portion and a cellular data network communication portion.

U.S. Pat. No. 8,169,983 issued to Janky claims to disclose a transcoder architecture and method for transcoding in LMR systems. The Janky LMR system includes a first communication site configured to communicate using a first LMR communication protocol and a second communication site configured to communicate using a second LMR communication protocol. The Janky LMR system further includes a transcoder configured to receive LMR content from the first communication site communicated using the first LMR communication protocol and digitally convert the LMR content to the second LMR communication protocol to be communicated to the second communication site.

U.S. Pat. No. 8,634,799 issued to Economy claims to disclose an incident commander computing device that dynamically reconfigures subscriber unit usage of radio access networks by first identifying, based at least on a type of incident occurring within a particular geographic area, a first incident response group having a first higher priority for responding to the incident and a second incident response group having a second lower priority for responding to the incident, then identifying a first higher priority radio access network having a sufficient coverage level across the particular geographic area and a second lower priority radio access network having a sufficient coverage level across the particular geographic area, and finally assigning the first incident response group to the first higher priority radio access network and assigning the second incident response group to the second lower priority radio access network.

U.S. Pat. No. 8,676,243 issued to Blanco claims to disclose a communication system that provides dual-watch and multi-watch capability for group PTT services where incoming PTT calls are prioritized and played out in accordance with prioritization protocols. In the Blanco system a user of multiple communication devices can hear received audio traffic being played out in accordance with the priority assigned to the group call and the priority assigned to the communication device, and numerous calls can be simultaneously received and managed.

SUMMARY OF THE INVENTION

A hardened VoIP system is presented that includes secure PTT voice functionality. Through the addition of encryption, authentication, user filtering, and integration with new and existing LMR systems, a secure voice platform ensures macious software, unauthorized access and brute force security attacks will not compromise the voice communications of the system. The VoIP system is engineered to ensure graceful system degradation in the event of maintenance activities, natural disasters and failure modes. The hardened VoIP system offers the functions a LMR trunking system while utilizing broadband connections. Private calls, group calls, Emergency Alarms with covert monitoring capability, scanning and priority scanning may be incorporated into the system. The system includes a VoIP controller that serves as a trunking controller, manages available VoIP based conference bridges, and assigns them as needed to the parties involved in each voice call.

The system allows for standard LMR functionality and the ability for supervisor tablets and smartphones to participate in and monitor VoIP calls between the dispatch center, mobile workforce and revenue vehicles. The system also provides supervisor tablets and smart phones the capability to scan talk groups in active calls, setup calls to other users, including closed microphone users, without dispatch or other third party intervention using private call feature.

The hardened VoIP system provides an integrated mobile product that allows the system to gracefully fallback to the LMR infrastructure in the event of a broadband network outage. The integration of hardened VoIP and LMR allows new or existing LMR capital resources to be used to bridge various radio technologies and further allows switching algorithms to seamlessly and gracefully degrade from hardened VoIP to LMR without user intervention in the event of a broadband outage.

BRIEF DESCRIPTION OF THE DRAWINGS

Preferred embodiments are described with reference to the following drawings, wherein:

FIG. 5 illustrates an example of data that may be found in a talk group database.

DETAILED DESCRIPTION

The present invention may be used with any type of hardened communication system and is particularly suited for police, fire, and transit systems. However, for descriptive purposes, the present invention will be described in use with a municipal bus system.

Figure 1:
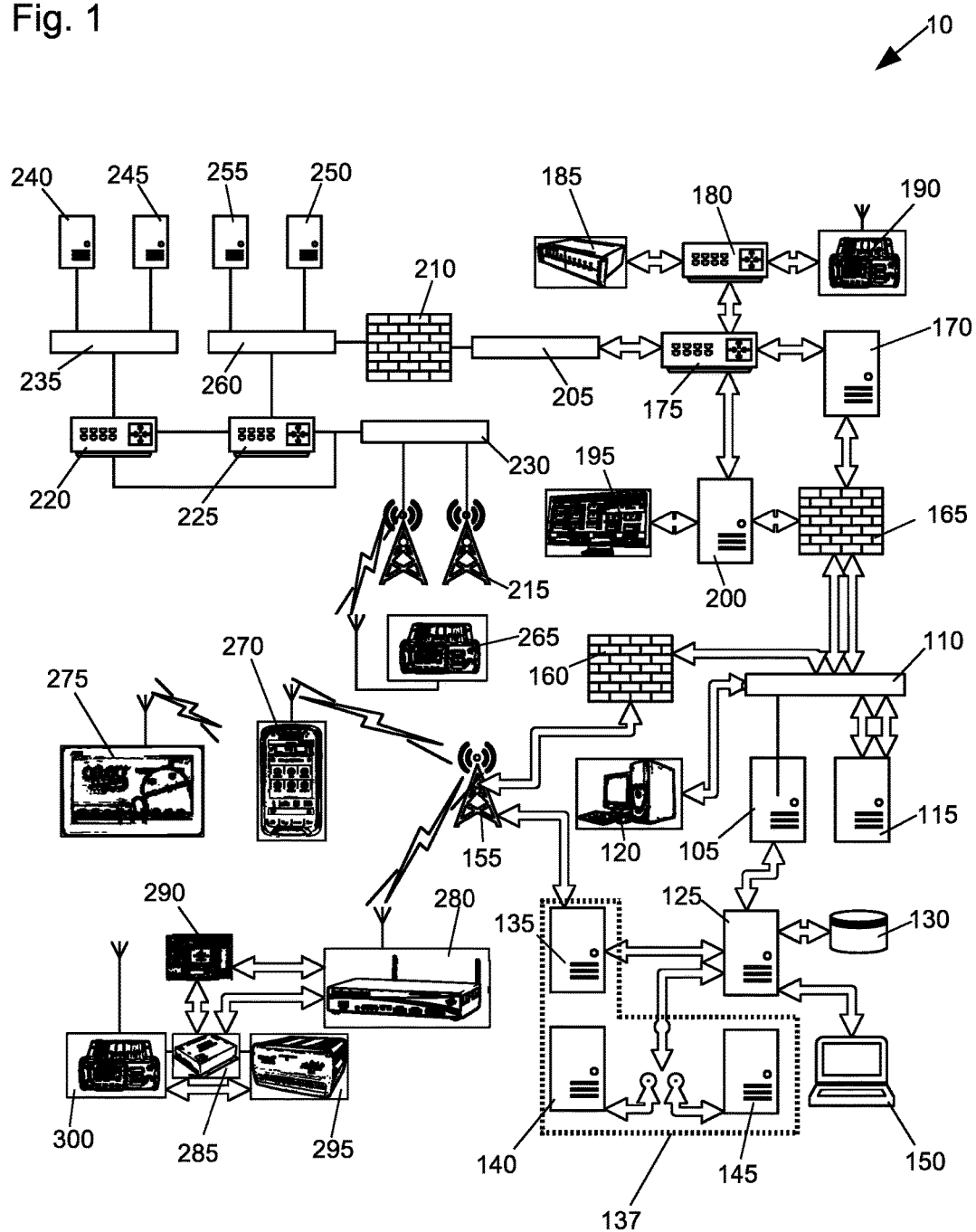
FIG. 1 illustrates an exemplary embodiment of a hardened VoIP system.

FIG. 1 shows a schematic of a hardened VoIP communication system 10 that includes a server 105 connected to a switch 110 that relays data to a data communication controller 115. Users may configure and/or monitor the system through the use of client devices 120 with access the switch 110. The server 105 also communicates with the VoIP channel controller 125 that receives and stores data from a VoIP database 130. The channel controller 125 is configurable to transmit data to both a local VoIP switch 135, a hosted VoIP Switch 140, and a hosted conference bridge 145. The local VoIP switch 135, the hosted VoIP switch 140, and the hosted conference bridge 145 are all session devices 137 that create SIP RTP sessions with mobile devices. A terminal 150 may be used to access and/or configure the VoIP Channel controller 125.

The VoIP switches (135, 140) are configured to communicate with commercial cellular towers 155 to transmit communications in an LTE, WiMax, EvDO UNITS, HSPA or similar format to distant communication devices.

In addition to communicating with the cellular towers 155 via the VoIP cannel controller 125, the server 105 is configured to also be able to communicate with the cellular towers 155 via the switch 110 through a firewall 160. In one example of the system, the switch 110 transmits data to the cellular towers 155 via an access point name gateway while in alternative embodiments an independent interne service provider is utilized to transmit data to the cellular towers.

In addition to communicating through cellular data formats, the switch 110 may transmit communications data through a firewall 165 to a server 170, such as a Zetron ACOM EVO server, that relays the communication to a dispatch switch 175 and a router panel 180 such as the Telex IP-224 Dual IP Remote Adapter Panel. The router panel 180 is connected by 4 wire audio to an RoIP rack 185 with Ethernet or cellular data connectivity and also via 4 wire audio to auxiliary LMR radios 190. Dispatchers may access the system through a console client 195 such as a Zetron ACOM EVO Client that communicates with the dispatch switch 175 via a dispatcher server 200.

A DMZ switch 205 is connected to the dispatch switch 175 and acts as a demilitarized zone, or perimeter network, that contains and exposes the system's external-facing services to a larger intrusted network. In addition to the DMZ switch 205, the radio dispatch functionality is also protected by another firewall 210.

The land mobile radio equipment includes LMR towers 215 that communicate with first and second routers (220, 225) via a backhaul switch 230. The first router 220 communicates with a LAN switch 235 and receives communications from VMS servers (240, 245). The second router 225 communicates with the DMZ switch 205, a gateway GPRS Support Node 250 and a PDG 255 via a second LAN switch 260.

By transmitting via both the cellular towers 155 and the LMR towers 215, the system is able to communicate with a variety of devices including LMR based devices 265 such as the Motorola APX6500. The system is able to communicate with bi-functional devices 270 such as the Motorola LEX L10 that has LTE connectivity as well as LMR connectivity. Additionally, the bi-functional devices 270 may be used to extend connectivity to Wi-Fi devices 275 that are closely located with the bi-functional devices 270. The system may also communicate with cellular exclusive devices 280 such as the Digi Router WR44, a commercial grade cellular to Wi-Fi converter. Through a Universal Radio Logic Controller 285 and proprietary onboard hardware 290, the cellular exclusive device 280 provides data to a vehicle logic unit 295 that delivers processing power and communication with other on-board technologies and may provide real-time access to schedule, route and traffic information, on-time performance data, and messages to and from dispatch. The Universal Radio Logic Controller 285 and the vehicle logic unit 295 are also be connected to an LMR Radio 300 that provides redundancy in the event off a malfunction in the cellular towers 155 or the cellular exclusive device 280.

The VoIP channel controller 125 of the illustrated system is a hardened VoIP controller and is configured to provide VoIP encryption, authentication, authorization, and accounting in a bandwidth efficient manner for the system. The VoIP channel controller 125 is shown as a single device in FIG. 1, however it should be appreciated that multiple geographically redundant VoIP channel controllers may be utilized in exemplary embodiments of the system such that an occurrence (fire, flood, power outage, etc.) at a single location would not disrupt communications in the overall system.

The RoIP rack 185 performs 4 wire LMR to VoIP conversions and has Ethernet or cellular connectivity. While there is a single RoIP rack 185 shown in FIG. 1, in an exemplary embodiment there is one module per talk group such that multiple RoIP racks may be utilized by the system. In the event of an RoIP rack failure, the multi-rack system is configured to automatically shift talk groups over to any available module on the other RoIP racks to ensure seamless degradation of the system upon a component failure.

The console client 195 is interfaced with the RoIP rack 185 and allows dispatchers to access specific talk groups, and or reconfigure specific talk groups as needed. CSSI, DFSI, and AFSI links may also be used to interface to LMR radio infrastructure.

Figure 2:
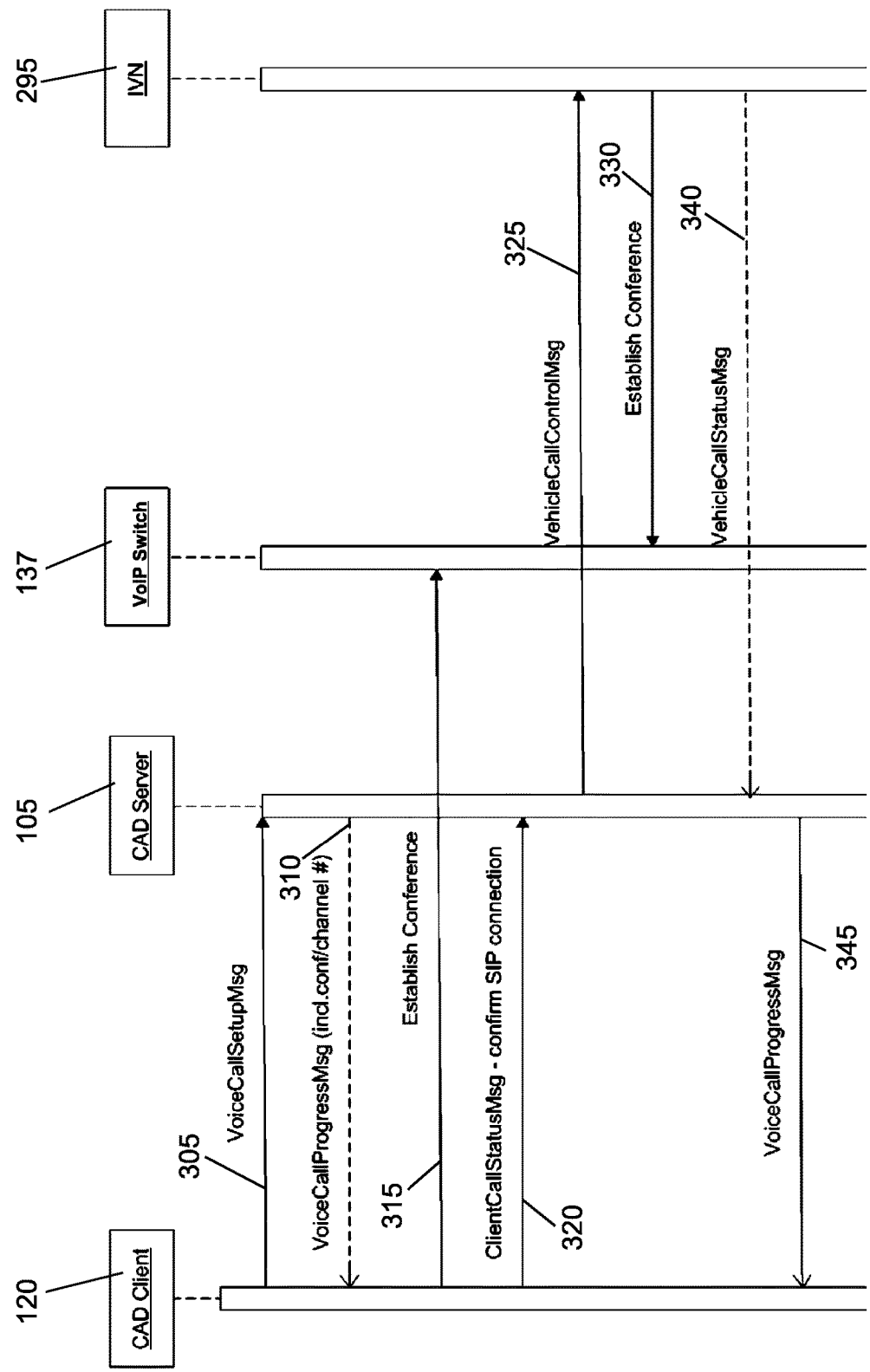
FIG. 2 illustrates an example of a P solution for mobile devices.

FIG. 2 illustrates an example of a call setup from a client device 120 to a vehicle with a vehicle logic unit 295. The client 120 sends a setup message 305 to the server 105 that responds with a call progress message 310 that includes conference and channel numbers. Using the received information, the client device 120 establishes a conference bridge 315 to the session device 137 and transmits a call status confirmation 320 to the server 105 that relays a control message 325 to the vehicle logic unit 295 that in turn establishes a conference 330 with the preselected session device 137 while transmitting a confirmation 335 to the server 105. The server 105 then provides a progress message 340 to the client device 120.

While the system of FIG. 2 provides mobile VoIP capabilities there are a few issues with the system. In particular, the system requires a large amount of system bandwidth (e.g., 12 Mbps for a 350 vehicle call) due to iLBC vocoder requirements. Additionally, the system loses operability if the server 105 is taken offline or if the system is placed in to administrative fall back.

Figure 3:
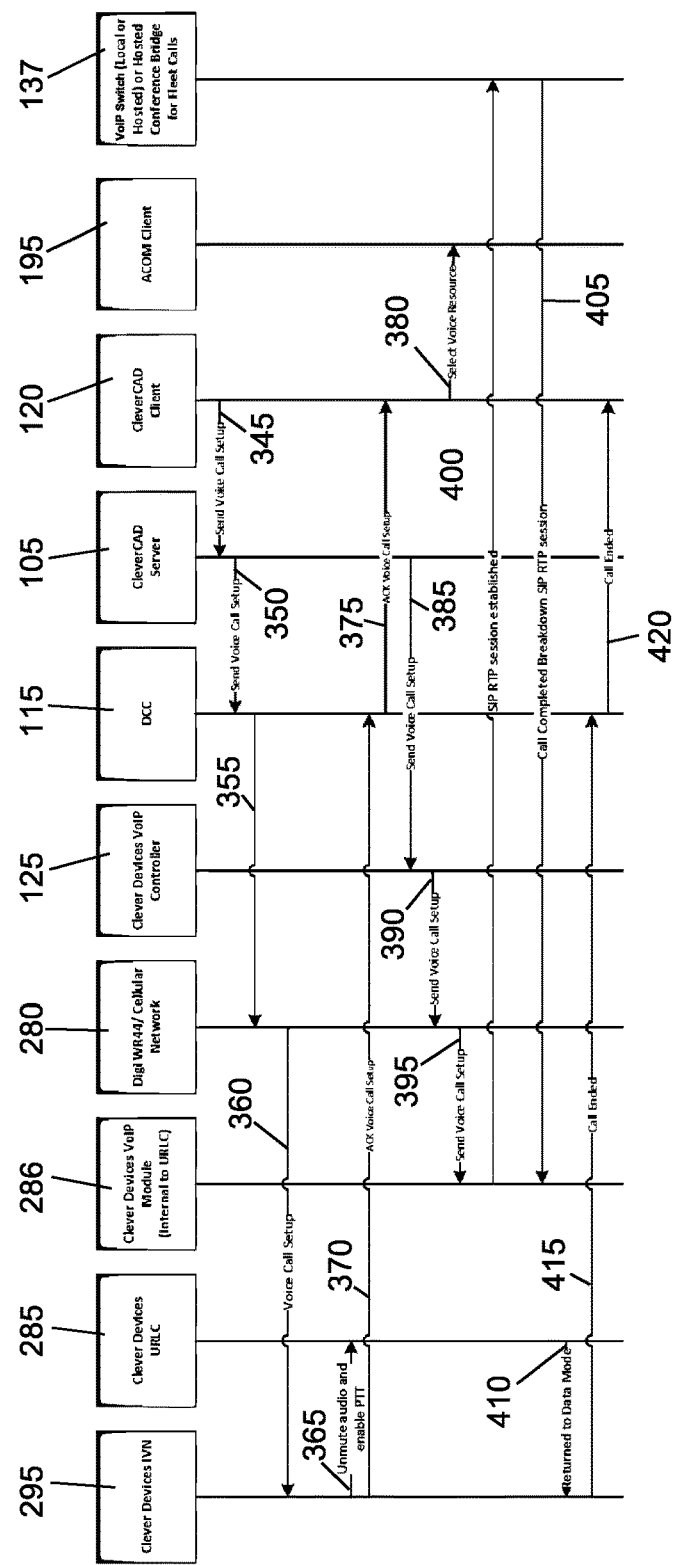
FIG. 3 illustrates an improved VoIP solution for mobile devices.
Figure 4:
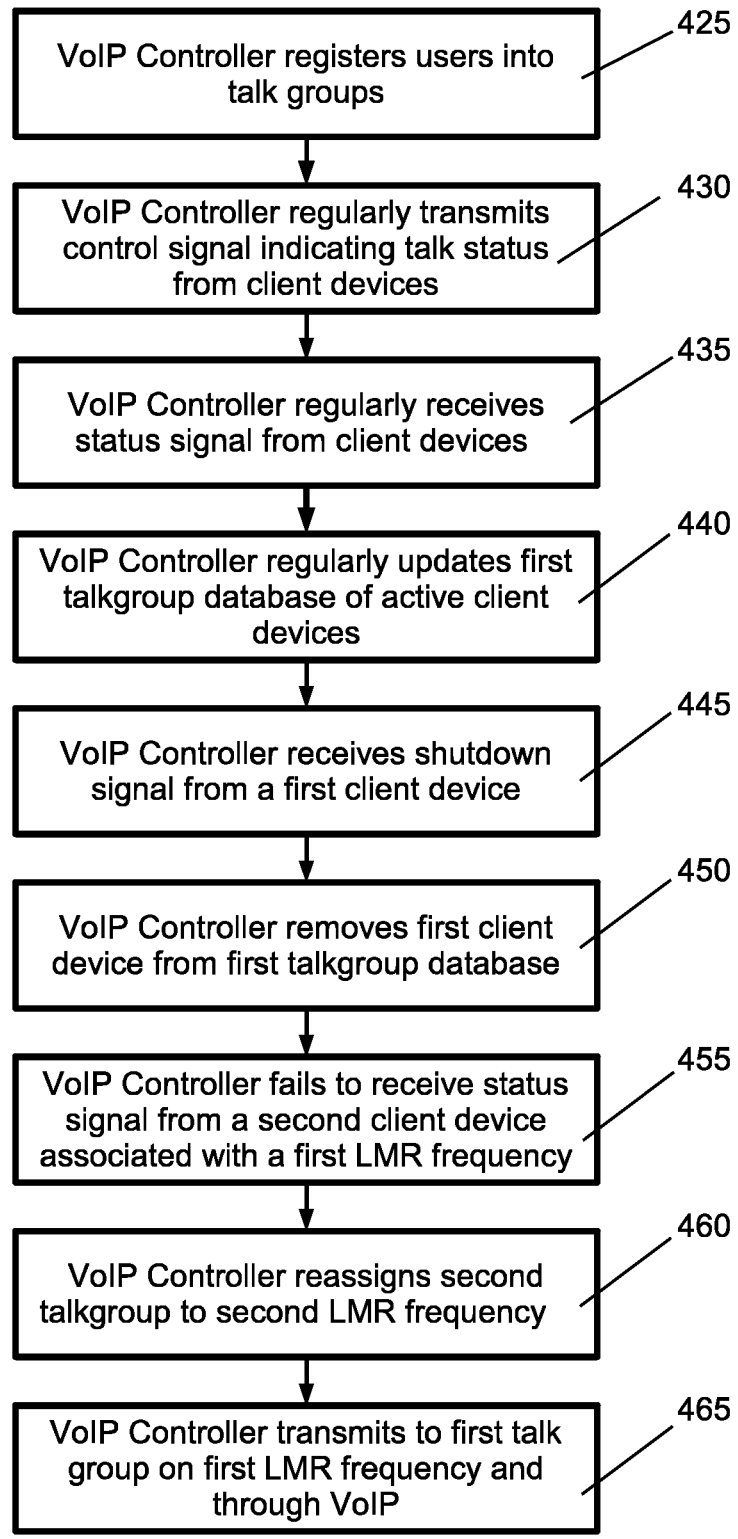
FIG. 4 illustrates a method of a VoIP controller registering client devices and updating talk group databases.

FIG. 3 illustrates an improved example of a VoIP call setup from a client device 120 client to a vehicle with a vehicle logic unit 295. In the illustrated example, the client device 120 sends a setup message 345 to the server 105 which relays the setup request 350 to the data communications controller 115. The data communications controller 115 transmits a setup signal 355 to the cellular exclusive devices 280 such as the Digi Router WR44 on board a vehicle. The cellular exclusive device 280 relays the setup request 360 to the vehicle logic unit 295 via the universal radio logic controller 285. In response to the setup request, the vehicle logic unit 295 sends a configuration communication 365 to the universal radio logic controller 285 to unmute audio and enable push-to-talk communication. The vehicle logic unit 295 sends an acknowledgment 370 to the data communications controller 115 wherein the voice call setup is relayed 375 to the client device 120 via the server 105. The client device 120 selects 380 the voice resource for the console client 195. The server 120 relays (385, 390, and 395) a VoIP call setup request to the Universal Radio Logic Controller 285 and a VoIP module 286 with Universal Radio Logic Controller 285. The VoIP module 286 establishes at 400 a session initiation protocol (SIP) real-time protocol (RTP) session with one of the session devices 137 (local VoIP switch 135, the hosted VoIP switch 140, or the hosted conference bridge 145). Upon the completion 405 of the session (either intentionally or unintentionally) the Universal Radio Logic Controller 285 signals 410 the logic unit 295 which relays (415, 420) the termination of the session to the client device 120 via the data communication controller 115.

FIG. 3 illustrates an example of a registration method and graceful fallback in the event of a system deterioration. In step 425, the VoIP controller receives an initiation communication from a user client device and assigns the device to a talk group (fire talk group, transit talk group, police talk group, etc.). At regular intervals, at step 430, the VoIP controller transmits control signals to the client devices. The regular flow of transmissions from the VoIP controller to the client devices allows the Universal Mobile Access Radio Link Control (URLC) devices on the client devices to quickly determine if there has been a deterioration in the cellular based communication. In addition to regularly transmitting control signals in step 430, the VoIP controller is configured to regularly receive status updates from client devices at step 435. Similar to the control signal from the VoIP controller allowing the client devices to determine if there has been a breakdown in VoIP communications, the status signals from the client devices allow the VoIP controller to determine which devices are active. In an exemplary embodiment of the invention, the control signals and status signals are both of small file size such that the cellular data usage is minimized while the system is in standby mode.

At step 440, the VoIP controller updates the database associated with active client database. Shown in FIG. 5 are examples of some of the information that may be associated with the various clients in the active client database. In step 445, the VoIP controller receives an intentional shutdown signal from a first client device, and in step 450 the VoIP controller removes the first client device from the active client database.

In step 455, the VoIP controller fails to receive a regular status signal from a second client device. Reasons for possible loss in signal include the second client device moving outside of a zone having cellular data coverage, a problem with a cellular tower, or a malfunction with the cellular data transmitter associated with the second client device. Before the cellular data communication failure, LMR communication frequencies were associated with the second client device and stored by both the second client device and the VoIP controller. With the cellular breakdown, the predetermined LMR frequencies are assigned to the second client device, and at step 460 the talk groups unassociated with the second client device are reassigned LMR communication frequencies. At step 465, in response to a push-to-talk signal, the VoIP controller facilitates a voice communication to the client devices in the first talk group. While the second client device receives communications via LMR, the other devices in the talk group may receive the communication via cellular data, or even local Wi-Fi. In an exemplary embodiment of the invention, the transition from cellular LTE to LMR communications occurs seamlessly and without any manual configuration by the users of the client devices. In one embodiment of the invention, the system initiates the transition from LTE to LMR communications upon a detection that the LTE signal strength has fallen below a non-zero predetermined threshold.

FIG. 5 illustrates some of the information that is stored by the VoIP controller in the active client database. With each client device there may be stored a unique device identifier 470 along with a MAC address 475 associated with Wi-Fi communications and an IMEI 480 associated with cellular communications. The talk group 485 associated with each group is stored in the active client database along with the currently utilized communication form 490 and the talk 495 and receive 500 frequencies for backup LMR communications. Client devices 501-505 are listed as being in the first talk group while client devices 506-509 are in the second talk group. Most of the client devices (501, 502, 505, 506, 508, and 509) are utilizing cellular communications protocols while two devices (503, 504) are communicating via LMR and one device 507 is communicating via a Wi-Fi link. The forms of communication in the database are not static and are expected to change. As an example, a client device 507 may be associated with a fire truck parked at a firehouse that communicates with the VoIP controller via the firehouse Wi-Fi. When the firetruck leaves the firehouse, the client device 507 automatically switches over to a cellular communication protocol once the firehouse's access point is out of range. Should cellular and Wi-Fi communications be unavailable, the client device 507 on the firetruck would automatically begin to communicate using the predetermined land mobile radio frequencies (857.3375 and 860.3375 MHz). In an exemplary embodiment of the invention, the transition from Wi-Fi to cellular data to LMR and back is done automatically without any client user interaction and provides seamless fallback functionality such that a user may communicate using numerous different methods LMR, satellite, etc.) without the user being aware that a change has occurred.

Figure 6:
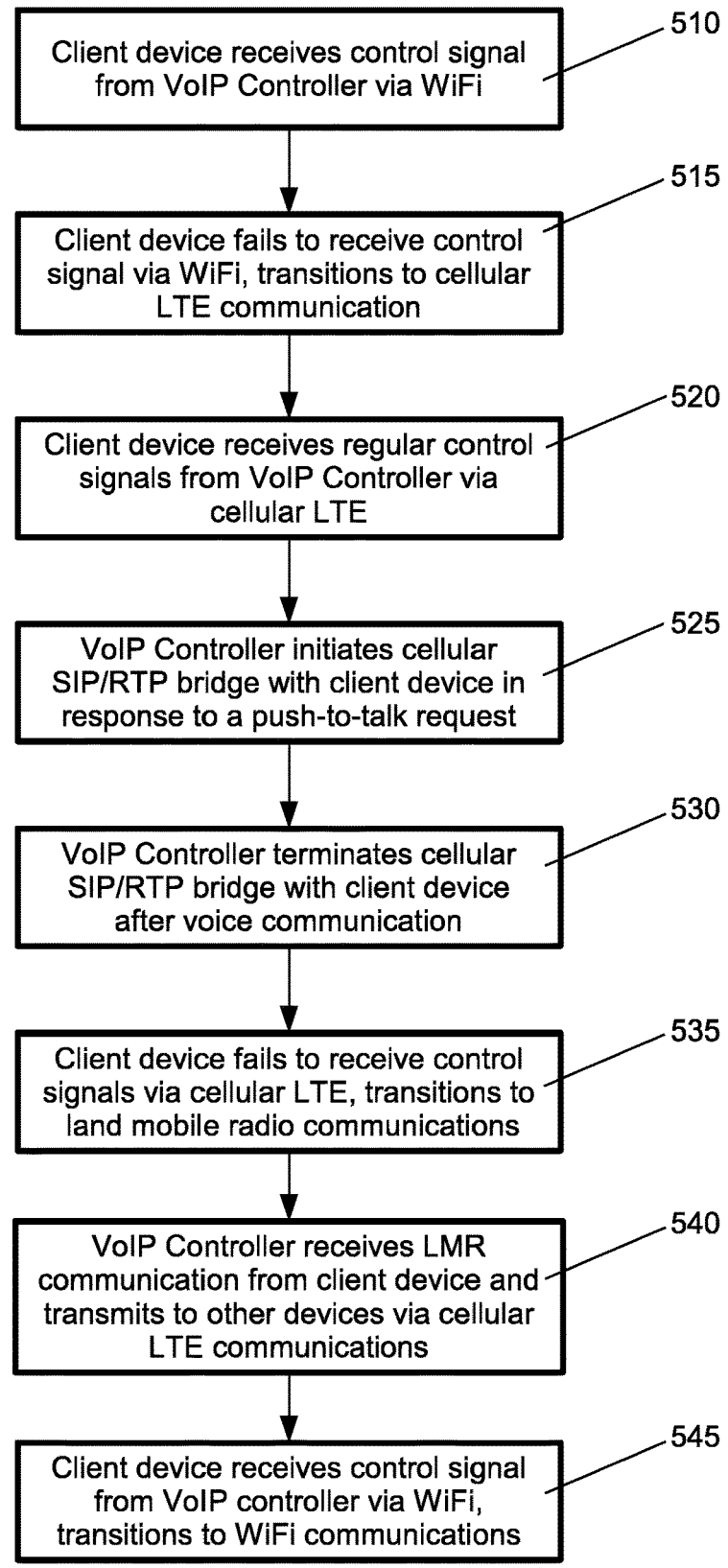
FIG. 6 is a flow diagram of a client device transitioning between numerous communication methods and systems.

FIG. 6 illustrates an example of a client device gracefully transitioning between multiple communication methods. At step 510, the client device regularly receives a control signal from a VoIP controller via Wi-Fi while the client device is in standby mode. A SIP/RTP bridge could be established by the VoIP controller upon a request to talk by a user. At step 515, the URLC aboard the client device detects that the control signal has not been received and transitions the client device to cellular communications. At step 520, the client device is once again in standby mode and at step 525 a SIP/RTP bridge is created between the client device and the VoIP controller in response to a voice communication. At step 530, the SIP/RTP bridge is terminated, and at step 535 the client device fails to receive the control signal via cellular or Wi-Fi communications so the client device transitions to land mobile radio communications. At step 540, the VoIP controller receives a LMR communication from the client device, and via cellular communications, establishes a SIP/RTP bridge with the other members of the client device's talk group. At step 545, the client device receives the control signal via and the LMR transmitter on the client device is deactivated.

In addition to the features previously discussed, numerous other features may be incorporated into the hardened VoIP system. For example, an authentication subsystem may be used to validate that a device is allowed to access the hardened VoIP infrastructure, and an authorization subsystem may be used to ensure that a user and a user's password for the system are valid. Numerous accounting/billing schemes may be utilized by a variety of agencies or groups. For example, a taxi dispatch system may purchase a hardened VoIP system while offsetting a portion of the cost by selling talk group functionality to the organizations or even individuals.

Numerous agencies (fire, police, EMT, etc.) of a municipality may be supported by a single system, and the talk group trunking functionality may be utilized to allow the various agencies to share communications lines without interfering with each other. The system may include encryption functionality that provides various levels of encryption to ensure user compliance with privacy, local, state and federal regulations. A Network Management Subsystem client may also be used that allows for the addition, deletion, and editing of system parameters such as system IDs, talk groups, agencies, usernames, device Ds and passwords. The system may be configured to allow two users to converse or text without the rest of the user group hearing the conversation, a private call feature may be implemented to allow communications between two users rather than being broadcast to the active registered talk group users.

The inventors contemplate several alterations and improvements to the disclosed invention. Other alterations, variations, and combinations are possible that fall within the scope of the present invention. Although various embodiments of the present invention have been described, those skilled in the art will recognize more modifications that may be made that would nonetheless fall within the scope of the present invention. Therefore, the present invention should not be limited to the specific examples described.

We claim:

1. A system for providing hardened VoIP and land mobile radio communication services to mobile devices, the system comprising:
    a controller configured
        in a first standby state to
            receive via a cellular communications system
                a first heartbeat signal from a first mobile device and
                a second heartbeat signal from a second mobile device,
            transmit via the cellular communications system
                a first status control signal to the first mobile device and
                a second status control signal to the second mobile device, and
            maintain a database with
                a first identifier associating the first mobile device with the cellular communications system and
                a second identifier associating the second mobile device with the cellular communications system;
        in a second standby state to
            receive via the cellular communications system
                the second heartbeat signal from the second mobile device,
            transmit via the cellular communications system
                the second status control signal to the second mobile device,
            monitor a channel of a land mobile radio system associated with the first mobile device, and
            maintain the database with
                the first identifier associating the first mobile device with the land mobile radio system and
                the second identifier associating the second mobile device with the cellular communications system; and
        to transition from the second standby state to the first standby state upon receiving the heartbeat signal from the first mobile device.

2. The system of claim 1 further comprising the controller configured
    in a first communication state to
        coordinate receipt, at a first VoIP switch, of a first communication from the first mobile device, and
        coordinate transmission, at the first VoIP switch, of the first communication to the second mobile device; and
    transition from the first standby state to the first communication state upon receipt, in the first standby state, of a push-to-talk initiation signal from the first mobile device.

3. The system of claim 2 further comprising the controller configured
    in a second communication state to
        coordinate receipt, at an RoIP gateway, of a second communication from the first mobile device via the channel of the land mobile radio system associated with the first mobile device, and
        coordinate transmission, at the first VoIP switch, of the second communication to the second mobile device; and
    transition from the second standby state to the second communication state upon receipt, in the second standby state, of a push-to-talk land mobile radio signal from the first mobile device.

4. The system of claim 3 further comprising the controller configured to transition from the first communication state to the second communication state upon a degradation of the first communication from the first mobile device.

5. The system of claim 3 wherein
the RoIP gateway converts the second communication from a LMR protocol to a VoIP protocol, and the
RoIP gateway includes a first rack with a first module and a second module;
the first mobile device and the second mobile device are in a first talk group associated with the first module; and
a third mobile device and the fourth mobile device are in a second talk group associated with the second module.

6. The system of claim 5 wherein
the controller is configured
    in the first communication state to coordinate transmission, at the first VoIP switch, the first communication to a first plurality of mobile devices of the first talk group; and coordinate transmission, at the RoIP gateway, the first communication to a second plurality of mobile devices of the first talk group.

7. The system of claim 6 wherein
the database, in the first communication state, associates
each of the first plurality of mobile devices with the cellular communications system and
each of the second plurality of mobile devices with the land mobile radio system.

8. The system of claim 5 further comprising:
a console client specifically configured for reassigning the first mobile device from the first talk group to the second talk group.

9. The system of claim 8 wherein
the first talk group is a police talk group, and the second talk group is a fire talk group.

10. The system of claim 2 wherein
the first status control signal includes an identifier of the channel of the land mobile radio system associated with the first mobile device.

11. The system of claim 2 wherein
the transition from the first standby state to the first communication state includes a Session Initiation Protocol initiating a Real-time Transport Protocol between the first mobile device and the second mobile device.

12. The system of claim 1 wherein
the first mobile device includes a land mobile radio connected to both an intelligent vehicle network and a cellular communication device via a Universal Mobile Access Radio Link Control module.

13. A method of providing hardened mobile VOIP and LMR services, the method comprising:
in a first state
transmitting a status signal via a cellular data channel to a first mobile device,
receiving a heartbeat signal via the cellular data channel from the first mobile device,
monitoring a first land mobile radio channel for a first communication from a second mobile device, and
associating, in a database, an identifier of the first mobile device with cellular data communications;
in a second state
monitoring the first land mobile radio channel for a first communication from the first mobile device and second mobile device, and
associating, in the database, the identifier of the first mobile device with land mobile radio communications;
transitioning from the second state to the first state upon receiving the heartbeat signal from the first mobile device;
transitioning from the first state to a third state upon receipt of a push-to-talk signal via the cellular data channel from the first mobile device;
in the third state
receiving, via the cellular data channel, a communication from the first mobile device,
converting the communication from a VoIP format to LMR format, and
transmitting the communication to a second mobile device via a land mobile radio format.

14. The method of claim 13 wherein
transitioning from the first state to the third state further includes establishing a hosted conference bridge between the first mobile device and the second mobile device.

15. The method of claim 13 further comprising
receiving a configuration signal from a dispatcher client; and
in response to receipt of the configuration signal
disassociating the first mobile device from a first talk group and
associating the first mobile device with a second talk group.

16. The method of claim 13 further comprising
transitioning from the first state to a fourth state upon detection of a push-to-talk signal on the first land mobile radio channel;
in the fourth state
receiving, via the first land mobile radio channel, a communication from the second mobile device,
converting the communication from an LMR format to a VoIP format, and
transmitting the communication to first mobile device via the cellular data channel.

17. The method of claim 13 further comprising
transitioning from the first state to a fifth state upon receipt of a shut-down notice from the first mobile device; and
in the fifth state
associating, in the database, the identifier of the first mobile device with inactive communications.

18. The method of claim 17 further comprising
in the fifth state
providing an active device list to a dispatcher client, the active device list indicating the first mobile device is inactive.

19. The method of claim 13, wherein
in the first state
transmitting the status signal via the cellular data channel to the first mobile device includes transmitting the status signal from a first VoIP controller, and
receiving the heartbeat signal via the cellular data channel from the first mobile device includes receiving the heartbeat signal at a second VoIP controller located at least 10 miles away from the first VoIP controller.

* * * * *